(12) United States Patent
Davis (10) Patent No.: US 8,783,366 B2
(45) Date of Patent: Jul. 22, 2014

(54) ARTICLE OF MANUFACTURE HAVING A SUB-SURFACE FRICTION STIR WELDED CHANNEL

(75) Inventor: Richard Davis, Houston, TX (US)

(73) Assignee: Smith International, Inc., Houston, TX (US)

( * ) Notice: Subject to any disclaimer, the term of this patent is extended or adjusted under 35 U.S.C. 154(b) by 418 days.

(21) Appl. No.: 13/077,024

(22) Filed: Mar. 31, 2011

(65) Prior Publication Data

US 2011/0240372 A1   Oct. 6, 2011

Related U.S. Application Data

(60) Provisional application No. 61/319,850, filed on Mar. 31, 2010, provisional application No. 61/393,605, filed on Oct. 15, 2010.

(51) Int. Cl.
*E21B 17/00* (2006.01)
*B23K 20/12* (2006.01)
*E21B 17/10* (2006.01)
*E21B 10/32* (2006.01)

(52) U.S. Cl.
CPC ............. *E21B 17/003* (2013.01); *B23K 20/122* (2013.01); *E21B 17/1085* (2013.01); *E21B 10/32* (2013.01)
USPC ........ 166/378; 166/242.1; 29/825; 228/112.1

(58) Field of Classification Search
USPC .............. 29/592.1, 593, 595, 825; 228/112.1, 228/2.1, 2.3; 166/378, 65.1, 242.1, 243; 175/320
See application file for complete search history.

(56) References Cited

U.S. PATENT DOCUMENTS

| 3,060,588 | A | * | 10/1962 | Lanmon, II et al. | 33/544.3 |
| 3,680,208 | A | * | 8/1972 | Bohne et al. | 29/825 |
| 4,256,518 | A | | 3/1981 | Bolton et al. | |
| 4,613,839 | A | * | 9/1986 | Foglesonger et al. | 333/239 |
| 4,648,546 | A | * | 3/1987 | Gellert | 228/161 |
| 4,665,996 | A | | 5/1987 | Foroulis et al. | |
| 5,244,559 | A | | 9/1993 | Latz | |
| 5,460,317 | A | * | 10/1995 | Thomas et al. | 228/112.1 |
| 6,019,628 | A | * | 2/2000 | Shinchi | 439/465 |
| 6,045,028 | A | | 4/2000 | Martin et al. | |

(Continued)

FOREIGN PATENT DOCUMENTS

| EP | 1690627 A2 | 8/2006 |
| JP | 11-20432 | 1/1999 |

(Continued)

OTHER PUBLICATIONS

Dictionary definitions of "tubular" and "tube", accessed Aug. 20, 2013 via thefreedictionary.com.*

(Continued)

*Primary Examiner* — Blake Michener (57) ABSTRACT

A method for routing an electrical conductor through a sub-surface channel in substantially any suitable metallic article of manufacture includes friction stir welding a cap in a groove formed in a surface of the article so as to form the sub-surface channel. An electrical conductor is then routed through the channel. The channel may further include a substantially tubular conduit formed therein with the electrical conductor being routed through the conduit. The friction stir weld zone formed during friction stir welding is generally harder and more wear resistant that the article body.

24 Claims, 8 Drawing Sheets

(56) References Cited

U.S. PATENT DOCUMENTS

| | | | |
|---|---|---|---|
| 6,309,762 B1 | 10/2001 | Speckert | |
| 6,375,865 B1 | 4/2002 | Paulson et al. | |
| 6,375,895 B1 | 4/2002 | Daemen | |
| 6,450,395 B1 | 9/2002 | Weeks et al. | |
| 6,601,475 B2 | 8/2003 | Davies et al. | |
| 6,648,206 B2 | 11/2003 | Nelson et al. | |
| 6,670,880 B1 | 12/2003 | Hall et al. | |
| 6,732,817 B2 | 5/2004 | Dewey et al. | |
| 6,861,612 B2 | 3/2005 | Bolton et al. | |
| 7,105,205 B2 | 9/2006 | Clayton et al. | |
| 7,124,929 B2 | 10/2006 | Nelson et al. | |
| 7,240,821 B2 | 7/2007 | Talwar | |
| 7,270,257 B2 | 9/2007 | Steel et al. | |
| 7,361,411 B2 | 4/2008 | Daemen et al. | |
| 8,186,561 B2 | 5/2012 | Allen et al. | |
| 8,365,408 B2* | 2/2013 | Seo et al. | 29/890.04 |
| 2002/0054972 A1 | 5/2002 | Charpentier et al. | |
| 2002/0108740 A1* | 8/2002 | Hidaka et al. | 165/135 |
| 2002/0153130 A1* | 10/2002 | Okamoto et al. | 165/170 |
| 2002/0179673 A1* | 12/2002 | Strombeck et al. | 228/1.1 |
| 2002/0190100 A1* | 12/2002 | Duncan, Jr. | 228/112.1 |
| 2005/0082342 A1 | 4/2005 | Babb et al. | |
| 2005/0139640 A1 | 6/2005 | Kay | |
| 2006/0049234 A1* | 3/2006 | Flak et al. | 228/112.1 |
| 2006/0086707 A1 | 4/2006 | Kou et al. | |
| 2006/0102354 A1 | 5/2006 | Gammage et al. | |
| 2006/0225926 A1* | 10/2006 | Madhavan et al. | 175/320 |
| 2006/0255094 A1 | 11/2006 | Taylor et al. | |
| 2006/0260797 A1* | 11/2006 | Hall et al. | 166/65.1 |
| 2006/0260798 A1* | 11/2006 | Hall et al. | 166/65.1 |
| 2007/0159351 A1* | 7/2007 | Madhavan et al. | 340/855.1 |
| 2007/0261226 A1 | 11/2007 | Deul et al. | |
| 2008/0000945 A1* | 1/2008 | Hidaka et al. | 228/2.1 |
| 2008/0106433 A1* | 5/2008 | Madhavan et al. | 340/854.4 |
| 2008/0115971 A1 | 5/2008 | Kelleher et al. | |
| 2008/0230155 A1 | 9/2008 | Lai | |
| 2010/0038407 A1 | 2/2010 | Keshavan et al. | |
| 2010/0038408 A1 | 2/2010 | Keshavan et al. | |
| 2010/0071961 A1* | 3/2010 | Steel et al. | 175/375 |
| 2010/0078224 A1 | 4/2010 | Steel et al. | |
| 2010/0264646 A1* | 10/2010 | Follini | 285/119 |
| 2011/0017334 A1* | 1/2011 | Peter et al. | 138/103 |
| 2011/0079446 A1* | 4/2011 | Oxford | 175/425 |
| 2011/0240374 A1* | 10/2011 | Davis et al. | 175/284 |
| 2012/0097385 A1* | 4/2012 | Villareal et al. | 166/162 |
| 2012/0273555 A1 | 11/2012 | Flak et al. | |
| 2013/0127632 A1* | 5/2013 | Madhavan et al. | 340/855.1 |

FOREIGN PATENT DOCUMENTS

| | | |
|---|---|---|
| JP | 2004034140 A | 2/2004 |
| JP | 2004-263568 | 9/2004 |
| JP | 2007237258 A | 9/2007 |
| KR | 1020010087185 A | 9/2001 |
| KR | 10-0762940 | 10/2007 |

OTHER PUBLICATIONS

Dictionary definitions of "groove" and "bore", accessed May 13, 2014 via thefreedictionary.com.*

J.G. Mobley, et al. A metallurgical approach to the design of hardbanding alloys; World Oil.com, The oilfield information source, vol. 229, No. 1, Jan. 2008 (9 pages).

J. Truhan, et al. Wear and friction of hard-faced claddings; Block-on-ring test configuration shows that cladding microstructure in new developmental alloys effects both cladding and casing wear; World Oil.com, The oilfield information source, vol. 229, No. 3, Mar. 2008 (8 pages).

S. Eickoff, Titanium-based hardbanding aims to balance protection for wear in casing, tool joints; Downhole Tools, Drilling Contractor, Mar./Apr. 2007 (2 pages).

Joe Haberer, Viable drill pipe hardbanding strategies are outlined, Drilling Contractor, Nov./Dec. 2000 (2 pages).

Joyce Berger, et al. The NanoSteel Company Pioneers Downhole Solution for Grant Prideco, Resulting in Revolutionary New Tool Joint Hardbanding Material, The Nanosteel News Release, Jun. 2005 (2 pages).

J.G. Mobley, Hardbanding and Its Role in Directional/Horizontal Drilling, SPE 52187 Society of Petroleum Engineers, Mar. 1999 (3 pages).

International Search Report and The Written Opinion of the the International Searching Authority for PCT/US2011/030705, Dec. 27, 2011, pp. 1-9.

International Preliminary Report on Patentability for PCT/US2011/030705, Oct. 2, 2012, pp. 1-5.

* cited by examiner

FIG. 6

ARTICLE OF MANUFACTURE HAVING A SUB-SURFACE FRICTION STIR WELDED CHANNEL

RELATED APPLICATIONS

This application claims the benefit of: (i) U.S. Provisional Application Ser. No. 61/319,850 entitled Friction Stir Welded Wire Channel for Downhole Tools, filed Mar. 31, 2010 and (ii) U.S. Provisional Application Ser. No. 61/393,605 entitled Friction Stir Welded Conduit Channel for Metal, filed Oct. 15, 2010.

FIELD OF THE INVENTION

The present invention relates generally to an article of manufacture having a friction stir welded channel. The invention further relates to methods for forming the friction stir welded channel. Particular embodiments of the invention relate to downhole tools (e.g., including drill pipe, under-reamers, hole openers, and stabilizers) having a friction stir welded channel and methods for making the same.

BACKGROUND OF THE INVENTION

The use of electronic communications is ubiquitous. Such communications commonly require the routing of electrical conductors between multiple locations in an article of manufacture. For example, in transportation applications, automobiles, ships, trains, airplanes, and other vehicles commonly bundle large numbers of conductors. These conductors are routed through various compartments in the vehicle, e.g., from a remote sensor to a central processor. While the use of external conductors is adequate for many applications, there are applications that can be problematic. For example, environmental exposure can cause corrosion and other degradation of the conductors which can in turn lead to communication loss. Deployment of conductor bundles in close proximity to moving parts can also be problematic as the conductors may inadvertently engage the moving parts.

Typical petroleum drilling operations employ a number of techniques to gather information about the borehole and the formation through which it is drilled. Such techniques are commonly referred to in the art as measurement while drilling (MWD) and logging while drilling (LWD). Transmission of data from a downhole tool to the surface is a difficulty common to many drilling operations. Data are commonly transmitted to the surface via encoded pressure pulses in a column of drilling fluid. While such 'mud pulse telemetry' techniques have long been commercially serviceable, they are also severely bandwidth limited (a typical mud pulse channel has a bandwidth on the order of about 1 to 20 bits per second).

In recent years, Intelliserv® has introduced a 'wired pipe' concept (referred to as Intellipipe®) in which the drill string is outfitted with a wire that enables high-speed two-way communication between the bottom hole assembly (BHA) and the surface (see for example U.S. Pat. No. 6,670,880). Proliferation of this technology has required downhole tool manufacturers to adapt their tools to accommodate the routing of an electrical conductor (e.g., a coaxial cable) through the length of the tool so as to be compatible with the wired drill pipe of Intelliserv®.

One technique that has been utilized is gun drilling a longitudinal bore through the entire length of the steel (or high strength steel) outer body of the tool. This process is both expensive and time consuming. Moreover, ensuring accurate placement of the bore along the entire length of the tool can be particularly problematic, especially in longer tools. Errors in the gun drilling process can significantly increase scrap rates during machining of the outer body portion of the tool. These increased scrap rates further increase the expense of the tool.

Therefore a need exists to be able to create a wire or cable channel in various articles of manufacture, for example, including vehicle bodies or frames. There is also a need to more quickly and inexpensively create a wire or cable channel in downhole tools in order to be compatible with wired drill pipe products. Additionally, there is a need to be able to create such channels without the need to appreciably alter the design of the existing tools.

SUMMARY OF THE INVENTION

The present invention addresses one or more of the above-described drawbacks of the prior art. One aspect of the invention includes a method for routing an electrical conductor through a sub-surface channel in substantially any suitable metallic article of manufacture (e.g., a downhole tool). The method includes friction stir welding a cap in a groove formed in a surface of the article so as to form the sub-surface channel. An electrical conductor is then routed through the channel. Such friction stir welding generally includes rotating a friction stir weld head in contact with the surface until a portion of the tool penetrates the tool. The friction stir weld head is then translated (while rotating) along a seam thereby creating a friction stir weld zone and joining the cap to surface.

Exemplary embodiments of the present invention advantageously provide several technical advantages. For example, the present invention advantageously reduces the cost and time required to 'wire' a downhole tool. Moreover, the invention generally eliminates the need to gun drill long bores through the length of a downhole tool body. Eliminating such gun drilling steps tends to reduce placement error and scrap rates and thereby further reduce costs. The use of a friction stir welding process is further advantageous in that it generates a weld zone having superior hardness and wear resistance as compared to the tool body (and in particular as compared to conventional arc welding processes that generally result in a softening of the tool body).

In one aspect the present invention includes a method for routing an electrical conductor through a sub-surface channel in a metallic article of manufacture. A groove is formed in at least one surface of the article. A metallic cap is fit into the groove, the cap being sized and shaped such that it creates a sub-surface channel in the groove (interior to the cap) and engages the side walls of the groove to form first and second seams between the groove and the surface. At least a portion of each of the seams is friction stir welded so as to secure the cap to the surface. An electrical conductor is drawn through the sub-surface channel.

In another aspect the present invention includes a method for routing an electrical conductor through a sub-surface channel formed in a downhole tool. At least one bore is gun drilled in a downhole tool body and a groove formed in at least one surface of the downhole tool body such that the groove and the bore are connected with one another. A substantially tubular conduit is deployed in the groove. A metallic cap is fit into the groove. The cap is sized and shaped such that it creates a sub-surface channel in the groove and engages the side walls of the groove to form first and second seams between the groove and the tool body. At least a portion of the first and second seams is friction stir welded so as to secure the cap to the tool body. An electrical conductor is drawn through the conduit in the sub-surface channel.

In still another aspect, the present invention includes an article of manufacture having a metallic body with a groove formed in a surface thereof. A metallic cap is deployed in the groove, the cap being sized and shaped such that a sub-surface channel is formed in the groove internal to the cap. The cap is joined to the outer surface of the body via at least one friction stir weld zone, the friction stir weld zone including a mechanical mixture of a portion of the metallic cap and a portion of the body. An electrical conductor is routed through the subsurface channel.

In yet another aspect, the present invention includes a downhole tool. The tool is configured for coupling with a drill string and includes a downhole tool body having a groove formed in an outer surface thereof. A metallic cap is deployed in the groove, the cap being sized and shaped such that a sub-surface channel is formed in the groove internal to the cap. The cap is joined to the outer surface of the body via at least one friction stir weld zone, the friction stir weld zone including a mechanical mixture of a portion of the metallic cap and a portion of the tool body. A substantially tubular conduit is deployed in the sub-surface channel radially between the cap and the tool body. An electrical conductor is routed through the conduit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
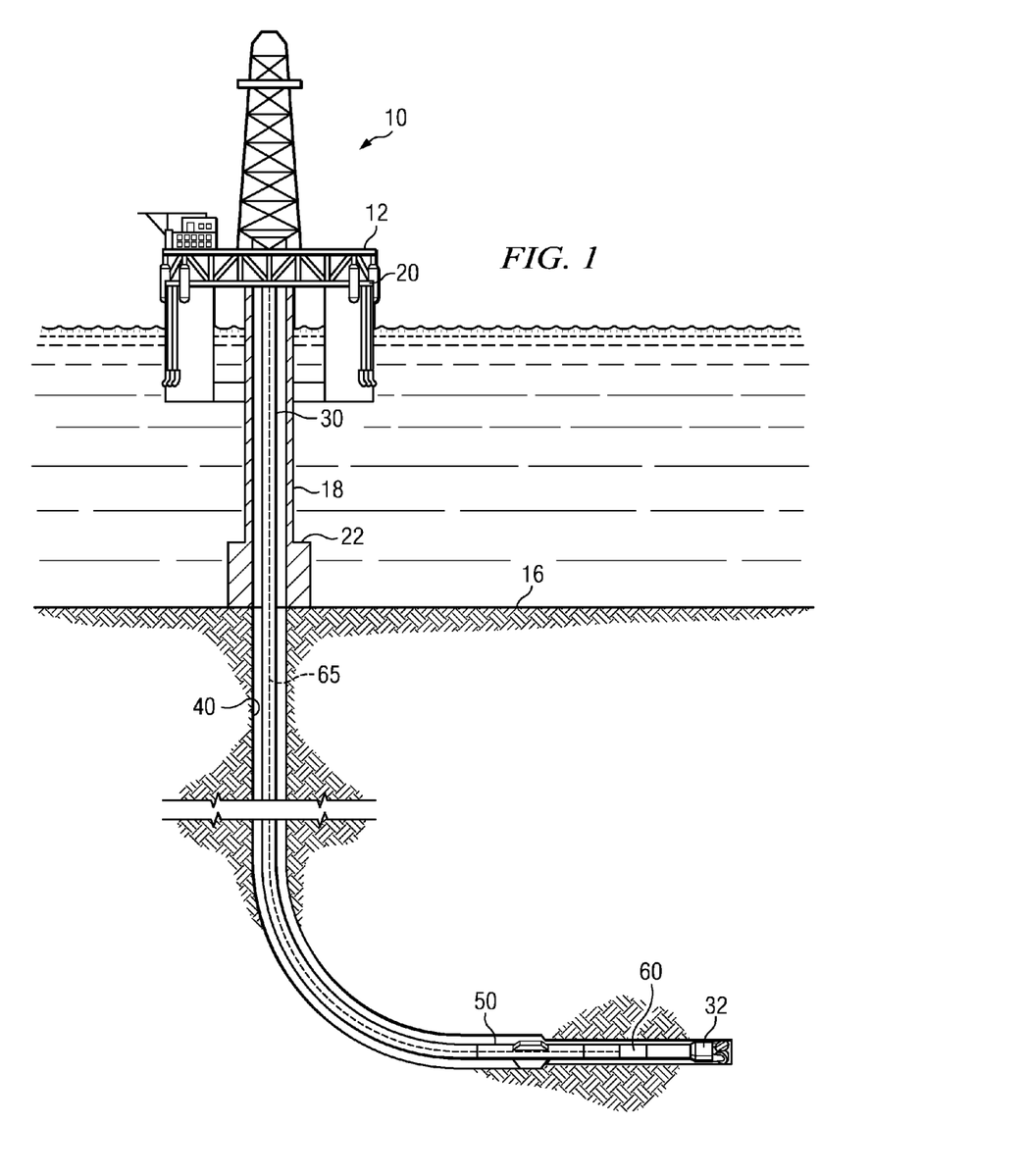
FIG. 1 depicts a conventional drilling rig on which exemplary downhole tools fabricated in accordance with the present invention may be utilized.

FIG. 1 depicts an exemplary offshore drilling assembly, generally denoted 10, suitable for deploying exemplary downhole tool embodiments in accordance with the present invention. In FIG. 1 a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes drill bit 32 at the distal end of the string. Drill string 30 is wired 65 thereby providing for direct electronic communication between a communications sub 60 deployed in the bottom hole assembly and the surface. The drill string 30 further includes a underreamer 50 deployed between communications sub 60 and the surface. Underreamer 50 has also been wired as indicated. Drill string 30 may optionally further include substantially any number of other wired downhole tools deployed to between the communications sub 60 and the surface including, for example, one or more stabilizers, cross over subs, expandable cutting tools, drilling jars, hole openers, underreamers, and the like.

It will be understood by those of ordinary skill in the art that the deployment illustrated on FIG. 1 is merely exemplary. It will be further understood that exemplary embodiments in accordance with the present invention are not limited to use with a semisubmersible platform 12 as illustrated on FIG. 1. The invention is equally well suited for use with any kind of subterranean drilling operation, either offshore or onshore. Moreover, the invention is not even limited to downhole tool embodiments. Exemplary method embodiments in accordance with the present invention may be utilized to deploy an electrical conductor in substantially any metallic article of manufacture. These may include, for example, vehicle components, shipping components, processing plant equipment, downhole completion components, subsurface production equipment, and the like.

Figure 2:
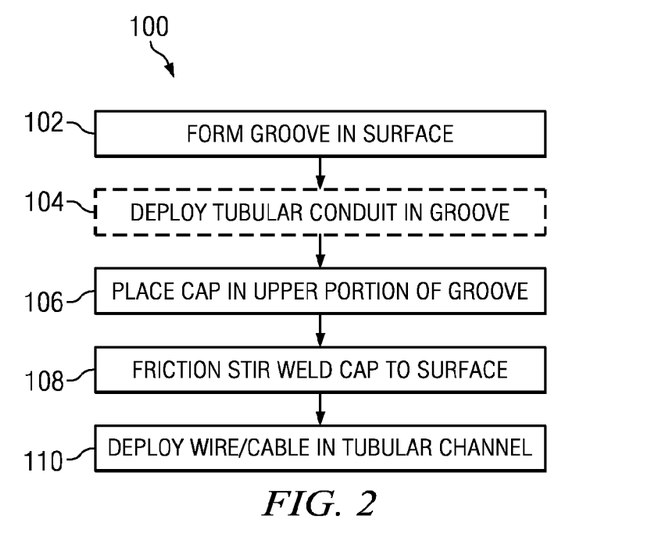
FIG. 2 depicts a flow chart of one exemplary method embodiment in accordance with the present invention.
Figure 3A:
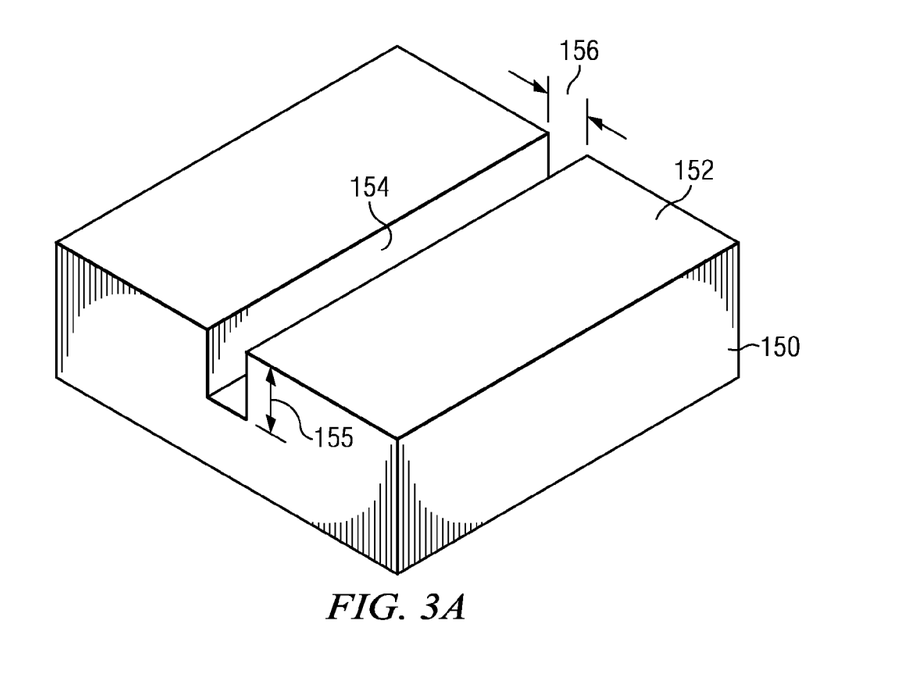
FIGS. 3A through 3G (collectively FIG. 3) further depict the exemplary method embodiment shown on FIG. 2.

FIG. 2 depicts a flow chart of one exemplary method embodiment 100 in accordance with the present invention. Method embodiment 100 is described with further reference to FIGS. 3A-3G. At 102 a groove (or pathway) 154 is formed in a surface 152 of a metallic component 150 (FIG. 3A). In the depicted embodiment, the groove 154 is substantially rectangular in cross-section and may be formed by substantially any process, for example, including one or more conventional machining steps. While not limited in this regard, groove 154 preferably has a depth 155 that is greater than its width 156 (as will become apparent). The depth to width ratio is preferably in the range from about 3:2 to 5:2, although the invention is in no way limited in this regard. Metallic component 150 may include substantially any article of manufacture in which it is advantageous to run an electrical conductor (e.g., a wire or cable).

Figure 3B:
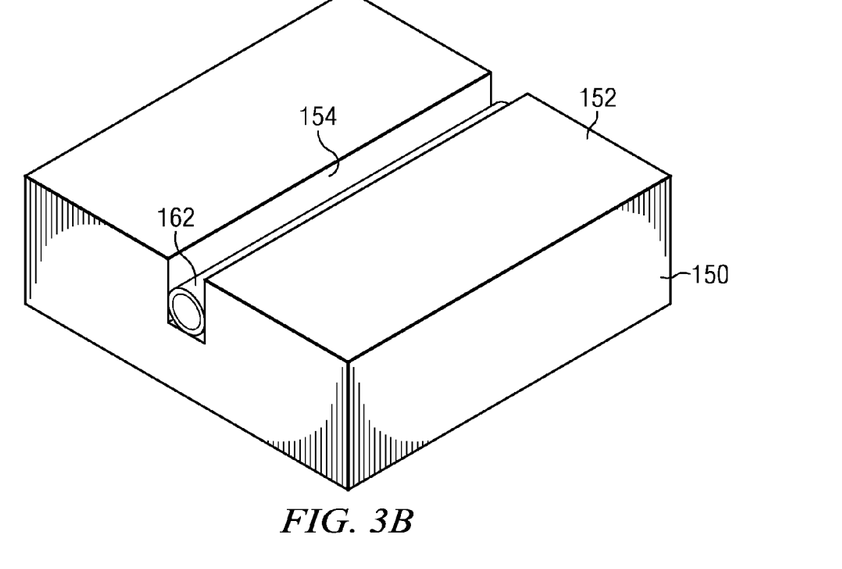

A tubular conduit 162 may optionally be deployed in the groove 154 at 104 (FIG. 3B). In downhole embodiments, the conduit preferably includes a stainless steel tube. While the use of conduit is preferred, it is not necessary (i.e., the invention is not limited in this regard). In downhole embodiments, the use of conduit is particularly preferred so as to further protect the deployed wire or cable from corrosive downhole fluids. In embodiments fabricated for certain other applications, the interior shape of the groove maybe formed such that it enables easy routing of a wire or cable without the use of conduit (e.g., the groove may have a rounded bottom surface).

Figure 3C:
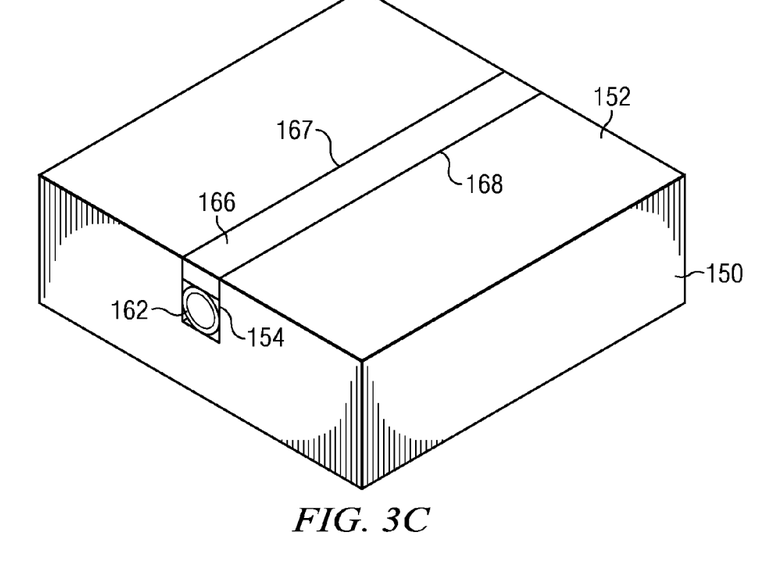

One or more cap sections 166 are placed in the groove 154 at 106 (FIG. 3C). While the conduit 162 could be run into the groove 154 after cap 166 has been secured in place, the conduit is preferably deployed in the groove before the cap. The cap 166 is preferably of a generally rectilinear (e.g., rectangular or square) cross-section and is sized and shaped to fit, preferably with a slight interference fit, into the groove 154. The cap has a top surface that is generally flush with the localized region of surface 152, which results in first and second substantially parallel seams 167 and 168 being present between the side surfaces of the cap in the interior walls of the groove.

Figure 3D:
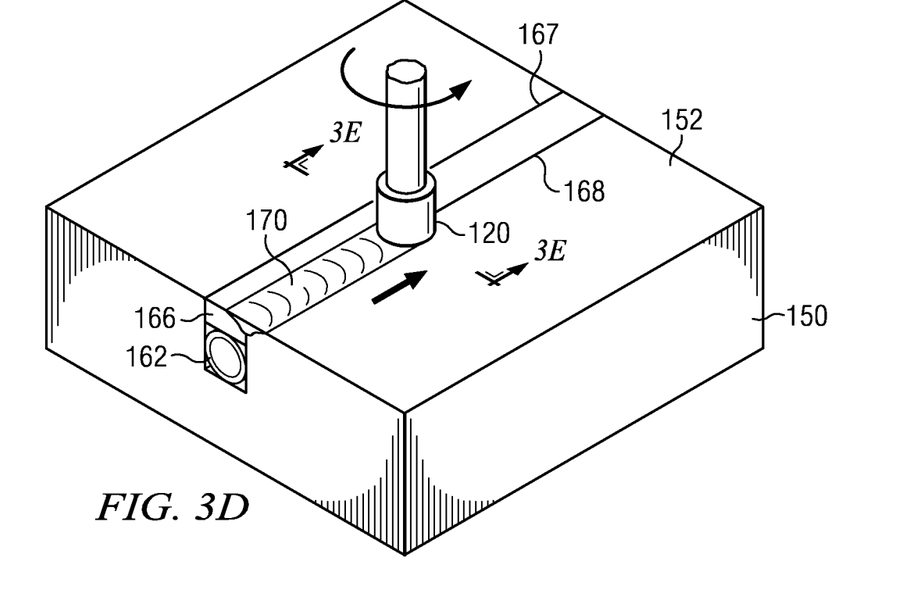

After the cap 166 has been placed in the groove 154, the seams 167 and 168 are friction stir welded at 108 to secure the cap in place and to remove at least a portion of the seams (FIG. 3D). Suitable friction stir welding processes for ferrous materials (e.g., plain carbon steels, stainless steels, high-strength steels, and the like) are described in more detail in U.S. Pat. No. 6,648,206, which is fully incorporated herein by reference. Such friction stir welding services may be provided, for example, by MegaStir® Technologies in Provo, Utah. Those of ordinary skill in the art will realize that friction stir welding processes sometimes leave metal flashing, debris, or other surface defects in the outer surface of the tool. These may be optionally removed, for example, via one or more post-processing surface polishing, grinding, and/or machining steps. The invention is not limited in these regards.

Figure 3E:
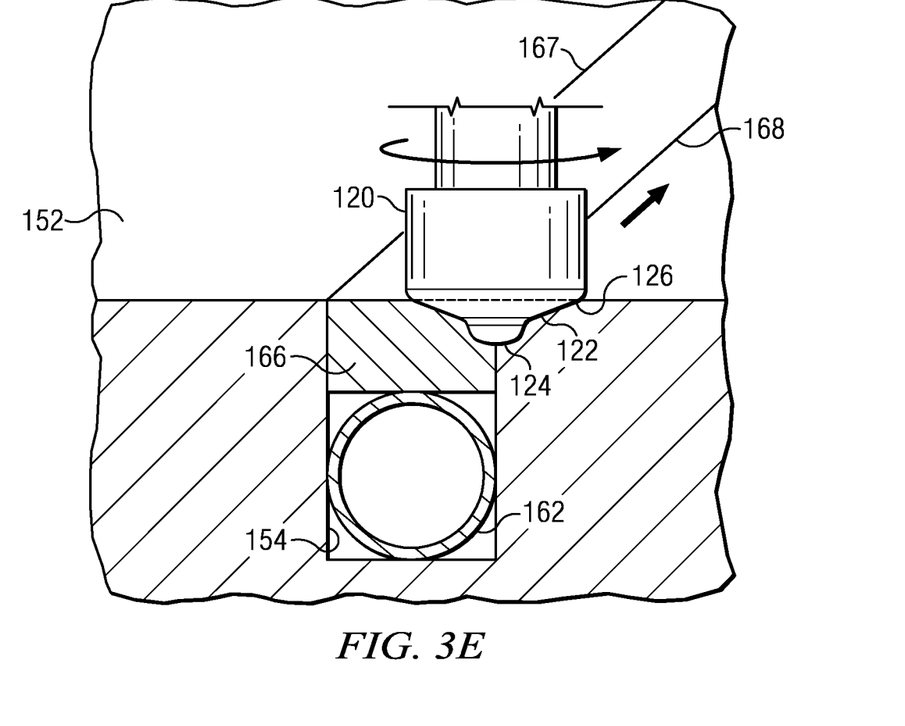
Figure 3F:
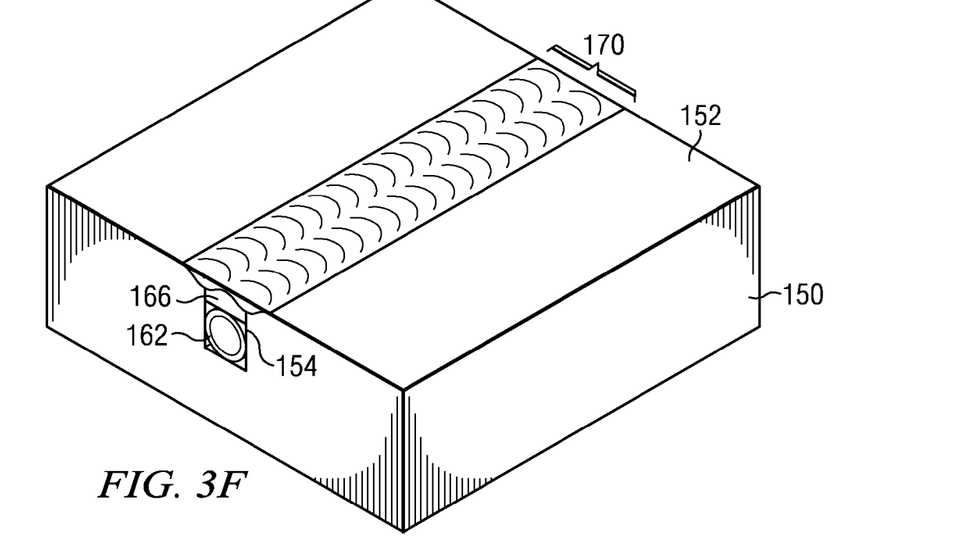

In general, friction stir welding involves rotating a friction stir weld (FSW) tool on the surface to be welded (e.g., at a seam location) until a portion of the tool penetrates the surface (FIG. 3E). The depicted FSW tool includes a substantially cylindrical head 120 having an engagement face 122 which in turn has a central pin 124 and an outer shoulder 126. The engagement face 122 is configured to engage surface 152 and is preferably coated with a layer of superabrasive such as polycrystalline boron nitride (particularly for use with ferrous alloys). The friction resulting from rotational contact between the FSW tool and the surface 152 causes a localized heating of the surface such that the pin 124 and sometimes a portion of the lower face 122 plunges into the component 150 while rotating (as depicted on FIG. 3E). It will be understood that rotation of the FSW tool can commence either before or after contact is made with the component. The FSW tool is then translated along the seam 168 while continuing to rotate. Translation and rotation of the FSW tool along the seam 168 causes a solid state stirring/mixing of the adjoining materials (the cap and tool body) which thereby removes the seam (at least in the vicinity of the surface). A friction stir weld zone is left behind as depicted at 170 of FIGS. 3D, 3F, and 3G (FIG. 3D depicts the partially welded component while FIG. 3F depicts the fully welded component).

This friction stir welding process may be used on both seams 167 and 168, either by making first and second passes of the FSW tool along the corresponding seams or by using a FSW tool of sufficient size (diameter) that both seams may be friction stir welded simultaneously. It will be understood that seams 167 and 168 are not necessarily friction stir welded along their entire length. These seams may alternatively be, for example, 'tack' friction stir welded at various locations along the lengths of the seams.

The friction stir weld step at 108 imparts a friction stir weld zone 170 to component 150 in the region of the welded seams. In the exemplary embodiment depicted on FIGS. 3A-3G this friction stir weld zone 170 is created using first and second partially overlapping passes of the FSW tool along the seams 167 and 168. The friction stir weld zone 170 is depicted in cross-section in FIG. 3G. Each pass of the FSW tool results in friction stir weld zone that is generally trough shaped in cross-section (as indicated). In the exemplary embodiment depicted, the partially overlapping passes result in a friction stir weld zone having a variable thickness (the thickness of the zone is maximum at the approximate center of each pass and decreases monotonically on either side of the path). While the invention is not limited in this regard, the thickness of the friction stir weld zone is preferably in the range from about 0.05 to about 0.25 inches. In general a thicker friction stir weld zone is preferable from the standpoint of weld integrity and the subsequent wear and abrasion resistance of the zone. However, increasing the zone thickness also tends to increase manufacturing difficulties as it requires increased forces (both translational and rotational forces) during the weld process. Depths in the range from about 0.05 to about 0.25 inches tend to provide a suitable balance between the need for obtaining a weld of high integrity and the desire to minimize the required forces.

One advantage of using a friction stir welding process is that it results in a weld zone having superior hardness and wear resistance as compared to the parent material (and as compared to conventional fusion (melt) welding processes that generally result in a softening and sometimes a susceptibility to cracking). For example, in one exemplary embodiment a metallic component 150 was fabricated from a AISI 4000 series alloy steel (commonly referred to in the art as high strength steel) and the cap 166 was fabricated from a comparatively soft AISI 1000 series alloy steel (commonly referred to in the art as plain carbon steel). Prior to friction stir welding, the high strength steel metallic component had a Brinnel hardness value of 329. After the friction stir welding step (and the mechanical mixing of the plain carbon steel cap and the high strength steel body), the friction stir weld zone had a Brinnel hardness value of 441. Despite the use of a relatively soft cap material, the friction stir welding process resulted in a weld zone that was significantly harder than the high strength steel body.

While not wishing to be bound by theory, it is believed that the friction stir welding process work hardens the friction stir weld zone (thereby increasing the hardness). It will be understood that friction stir welding is a solid-state process that imparts significant plastic deformation into the welded component. Therefore, by work hardens it is meant that the friction stir welding process plastically deforms the friction stir area thereby typically decreasing the grain size and increasing the dislocation density in the friction stir weld zone. Optical microscopy analysis of welded samples indicates that the friction stir weld zone has a grain size that is less than one-half that of the parent material. It is believed that the smaller grain size of the friction stir weld zone is at least partially responsible for the increased hardness.

With continued reference to FIGS. 2 and 3, the friction stir weld zone may sometimes include metal flashing, debris, and/or other imperfections (not shown). These may be optionally removed, for example, via the surface polishing, grinding, and/or machining steps described above. Such additional steps are not typically necessary from a wear or abrasion resistance standpoint or from a weld integrity standpoint, but may be desirable, for example, for aesthetic reasons.

Figure 3G:
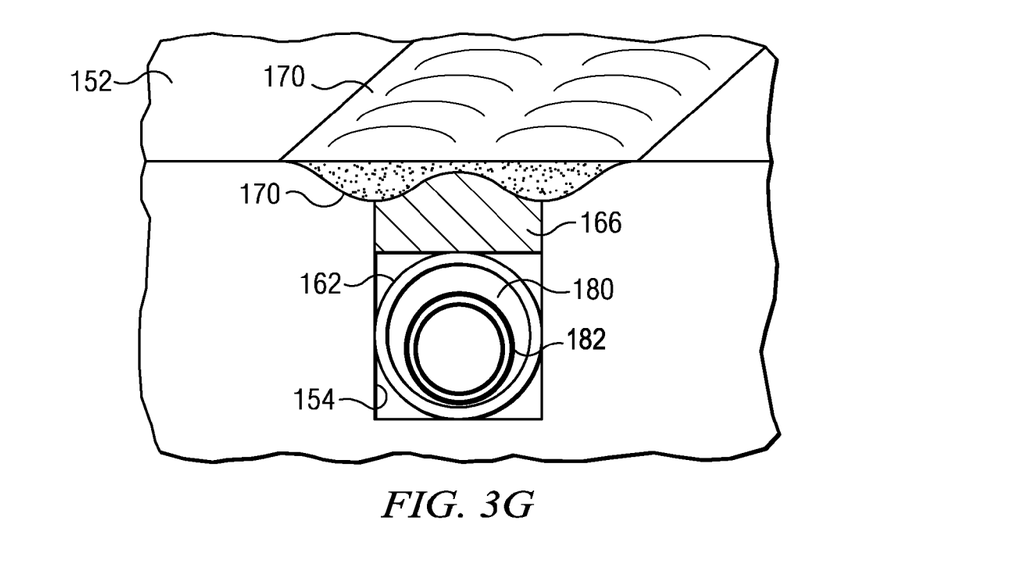

Once the cap 266 has been friction stir welded in place (in the groove as depicted, for example in FIG. 3G), a wire, cable (e.g., a co-axial cable), or conductor 182 may be routed at 110 (FIG. 2) through the resulting pathway 180 (e.g., through the interior of conduit 162). The electrical conductor 182 is shown in FIG. 3G.

Figure 4A:
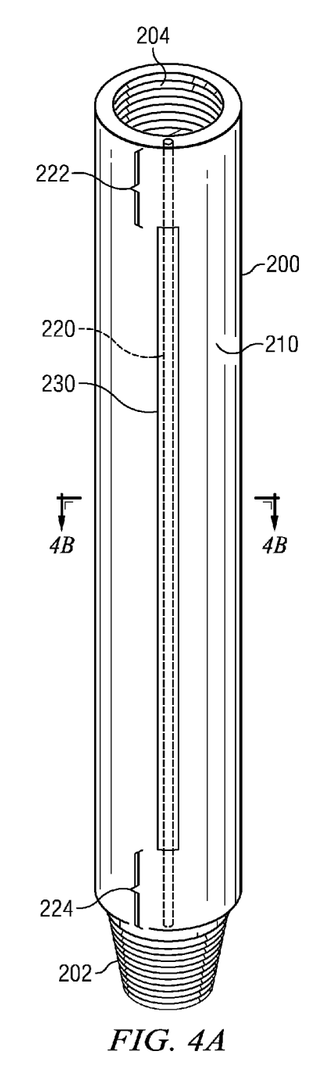
FIGS. 4A through 4C (collectively FIG. 4) depict a length of drill pipe fabricated in accordance with the present invention.
Figure 4B:
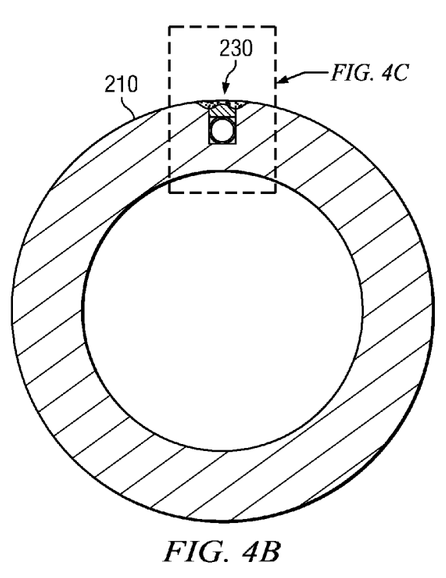
Figure 4C:
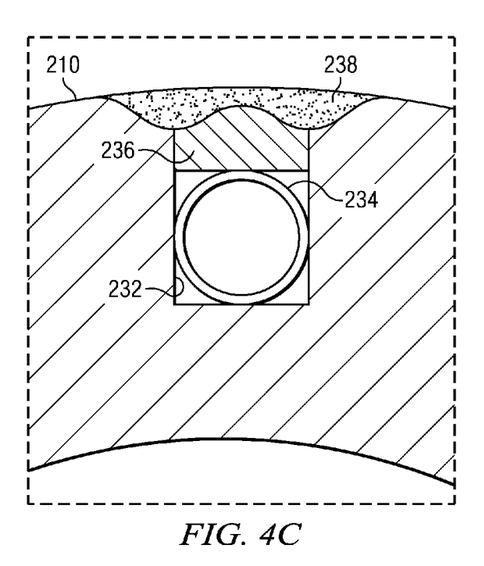

FIGS. 4A through 4C depict a general downhole tool embodiment 200 (e.g., a length of drill pipe or a cross-over sub) formed in accordance with the present invention. As is known to those of ordinary skill in the art, such downhole tools are generally fabricated from conventional steel alloys and include substantially cylindrical tubular member having first and second threaded ends 202 and 204. The downhole tool depicted on FIG. 4 further includes a channel 220 formed therein, at least a portion of which includes a friction stir welded conduit channel, generally depicted at 230, formed therein using a method in accordance with the present invention (e.g., method 100 in FIG. 2). In the depicted embodiment the channel 220 runs the length downhole tool 200 and is substantially parallel with a longitudinal axis thereof.

In the exemplary embodiment depicted, channel 220 includes first and second end sections 222 and 224 and a third central section 230. The end sections 222 and 224 include relatively short (as compared to the overall length of the drill pipe) gun drilled bores formed in the corresponding ends of the downhole tool 200. These bores may be, for example, on the order of about 1 or 2 feet in length and may advantageously reduce machining requirements in the vicinity of the threaded ends 202 and 204. The end sections 222 and 224 are connected with the central section (the friction stir welded conduit channel 230) to form the continuous channel 220 along the entire length of the tool body. The friction stir welded conduit channel 230 is similar to that described above with respect to FIG. 3 in that it includes a tubular conduit 234 deployed in a groove 232. A cap 236 is friction welded into the groove 234 (as indicated by friction stir weld zone 238) as shown and described above.

The gun drilled sections 222 and 224 and the friction stir welded conduit section 230 may be formed in substantially any order. For example, the gun drilled sections 222 and 224 may be drilled first (first one section and then the other) at the corresponding ends of the tool. The groove 232 may then be formed in the outer surface of the tool body such that it intersects bore sections 222 and 224. Alternatively, the groove 232 may be formed first. The gun drilled sections 222 and 224 may then be drilled at the corresponding ends such that they intersect the already existing groove. Again, the invention is not limited in these regards.

In one exemplary embodiment, tubular conduit 234 extends the entire length of the downhole tool 200. In such embodiments, the diameter of the gun drilled bore(s) is preferably approximately equal to or slightly greater than that of the outer diameter of the conduit. In an alternative embodiment, the tubular conduit 234 extends only the length of the friction stir welded conduit channel 230. In such embodiments, the diameter of the gun drilled bore(s) is preferably approximately equal to the inner diameter of the conduit 234. In still another embodiment, tubular conduit is not utilized. It will be understood that the invention is not limited in these regards.

Figure 5A:
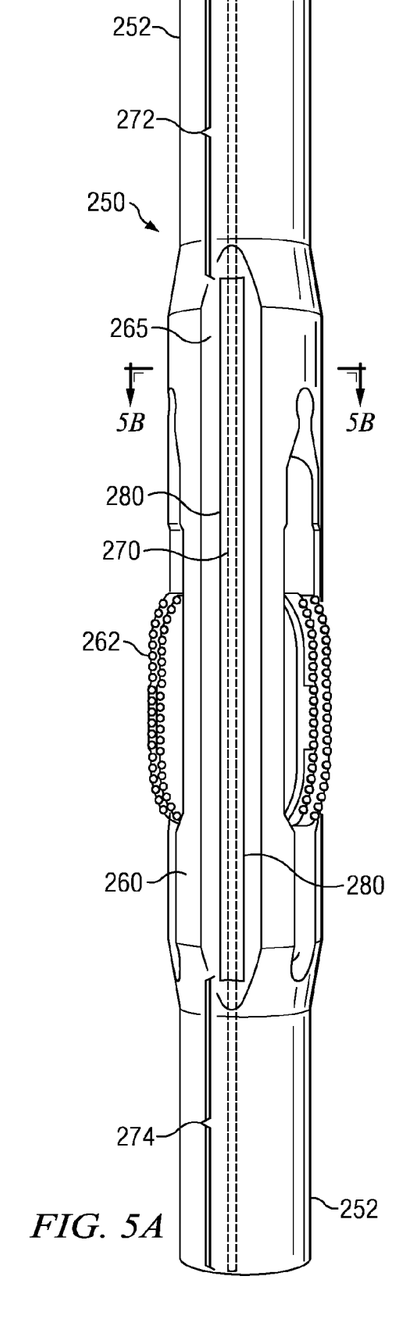
FIGS. 5A through 5C (collectively FIG. 5) depict a downhole underreamer tool fabricated in accordance with the present invention.
Figure 5B:
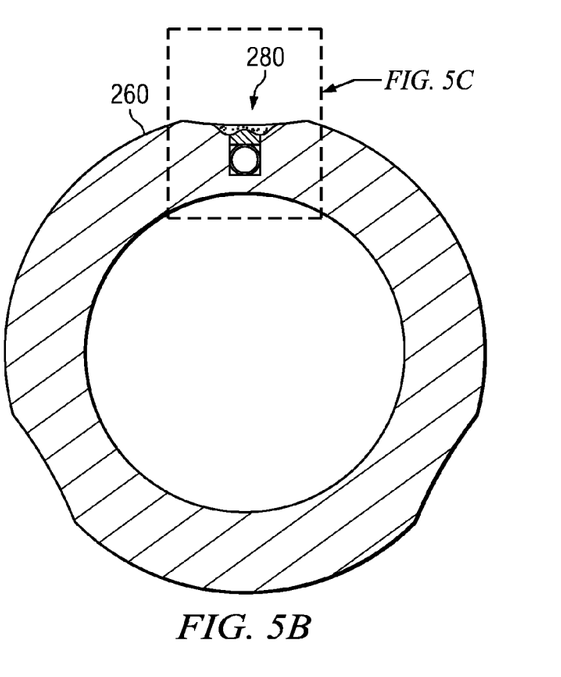
Figure 5C:
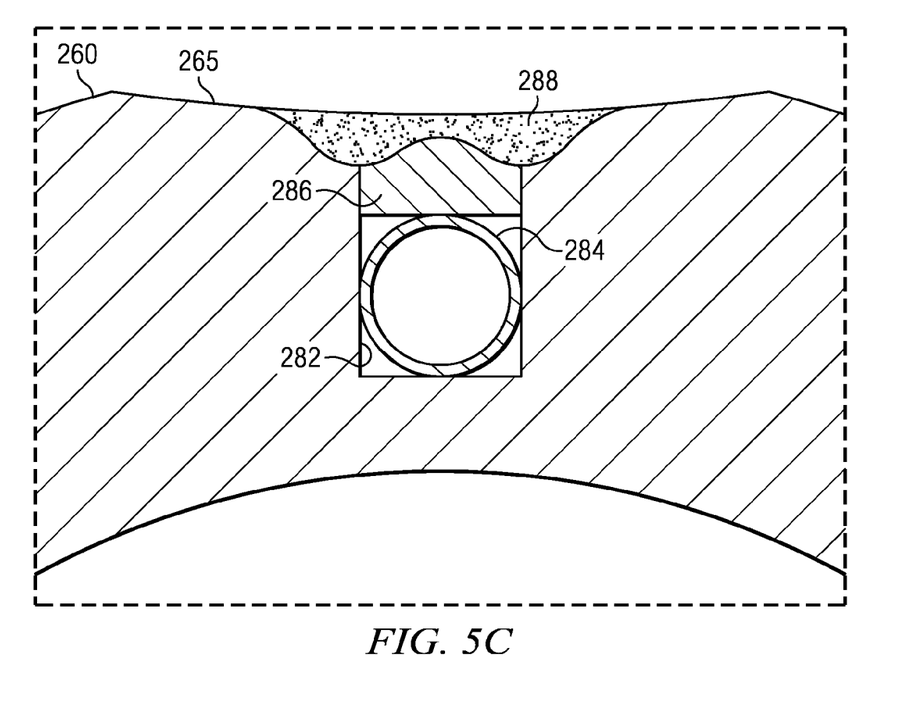

FIGS. 5A through 5C depict a Rhino® underreamer tool 250 fabricated in accordance with the present invention (underreamer 250 is similar to underreamer 50 depicted on FIG. 1). The functionality and general structure of the Rhino® tool is described in more detail in U.S. Pat. No. 6,732,817, which is fully incorporated by reference herein. A perspective view of the tool 250, which is sold by the assignee of the present application, is depicted in FIG. 5A. The tool includes a generally cylindrical external tool body 252 having a plurality of fixed blades 260 that extend radially outward from the tool body. Each of the blades includes a radially extendable/retractable cutting structure 262 deployed therein which is configured for cutting the borehole wall so as to increase the borehole diameter.

A friction stir welded conduit channel 280 is formed in one of the fluid courses 265 (also referred to as flutes) located circumferentially between the blades 260. Underreamer 250 is similar to the downhole tool embodiment 200 depicted on FIG. 4 in that it includes a contiguous channel 270 having first and second end sections 272 and 274 and a third central section 280 (the friction stir welded conduit channel 280). The end sections 272 and 274 include gun drilled bores formed in the corresponding longitudinal ends of the tool 250. These bores are connected to the central section 280 to form the continuous channel 270. The friction stir welded conduit channel 280 is also similar to that described above with respect to FIG. 3 in that it includes a tubular conduit 284 deployed in a groove 282. A cap 286 is friction welded 288 into the groove 284 as shown.

As described above with respect to FIG. 4, the gun drilled sections 272 and 274 and the friction stir welded conduit section 280 may be formed in substantially any order. Moreover, the tubular conduit 284, when used, may extend the entire length of the underreamer 250 or just the length of the friction stir welded conduit channel 280. The invention is not limited in these regards.

It will be understood that the downhole tool and underreamer embodiments depicted on FIGS. 4 and 5 need not include a multiple section conduit channel. In these embodiments, the friction stir welding conduit channel may extend the entire length of the tools. Moreover, the gun drilled sections need not be located at the longitudinal ends of the tool (in embodiments including a gun drilled section). Depending on the geometry of the outer surface of the tool body, it may be desirable to gun drill a bore through substantially any particular portion of the tool.

It will also be understood that the groove is not necessarily rectilinear in cross-section. Grooves having other shapes may also be utilized (e.g., a groove having a contoured bottom surface). Moreover it is not necessary that the groove have a constant depth or that it be linear in shape. The groove may be bowed or curved as needed to suit the geometry of any particular tool body or component that is being wired in accordance with the present invention. It will further be understood that articles of manufacture (e.g., downhole tools) may include multiple friction stir welded conduit channels in accordance with the present invention.

Figure 6:
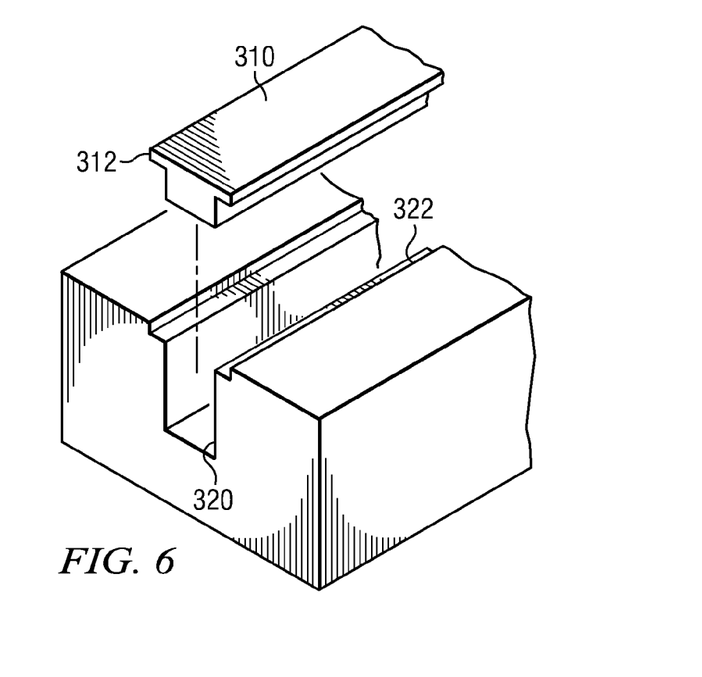
FIG. 6 depicts an alternative groove and cap arrangement.

FIG. 6 depicts an alternative groove and cap arrangement in accordance with the present invention. In the exemplary embodiment depicted, cap 310 includes a flange 312 formed in the upper surface thereof, while the groove 320 includes a corresponding mating recess 322. Friction stir welding processes often require large forces, therefore this arrangement may be advantageous in certain embodiments in that the flange 312 is configured to support the cap upon deployment in the groove and during the friction stir welding process (rather than the tube and/or an interference fit supporting the cap as depicted on FIG. 3C).

Although the present invention and its advantages have been described in detail, it should be understood that various changes, substitutions and alternations can be made herein without departing from the spirit and scope of the invention as defined by the appended claims.

I claim:

1. A method for routing an electrical conductor through a sub-surface channel in a downhole tool, the method comprising: forming a bore in a body of the downhole tool;
    forming a groove in at least one exterior surface of the body, the bore being aligned with and connected to the groove;
    fitting a metallic cap into the groove, the cap being sized and shaped such that:
    (i) it creates a sub-surface channel in the groove and
    (ii) it engages the side walls of the groove to form first and second seams between the groove and the surface;
    friction stir welding at least a portion of the first and second seams so as to secure the cap to the surface: and
    drawing an electrical conductor through the bore and the sub-surface channel.

2. The method of claim 1, further comprising:
deploying a substantially tubular conduit in the bore, the groove, or a combination Thereof.

3. The method of claim 1, wherein the downhole tool is selected from the group consisting of drilling pipe, cross over subs, expandable cutting tools, drilling jars, hole openers, underreamers, and stabilizers.

4. The method of claim 1, wherein friction stir welding at least a portion of the first and second seams further comprises:
 (i) rotating a friction stir weld head in contact with one of the seams until a portion of the head penetrates the surface; and
 (ii) translating the rotating friction stir weld head along at least a portion of the seam so as to create a friction stir weld zone and secure the cap to the surface.

5. The method of claim 4, wherein the friction stir weld zone comprises a mechanical mixture of a portion of the metallic cap and a portion of the surface of the article of manufacture.

6. The method of claim 4, wherein the friction stir weld zone has a hardness value greater than that of the surface of the article of manufacture.

7. The method of claim 1 wherein the cap is sized and shaped such that an outer surface of the cap is substantially flush with the surface of the article of manufacture upon said fitting.

8. The method of claim 1, wherein the cap comprises first and second flanges located at a top surface thereof, the flanges being configured to support the cap in the groove during said friction stir welding.

9. A method for routing an electrical conductor through a sub-surface channel formed in a downhole tool, the method comprising:
 gun drilling at least one bore in a downhole tool body;
 forming a groove in at least one exterior surface of the downhole tool body, the groove and the bore being connected with one another;
 deploying a substantially tubular conduit in the groove;
 fitting a metallic cap into the groove, the cap being sized and shaped such that it
  (i) creates a sub-surface channel in the groove and
  (ii) engages the side walls of the groove to form first and second seams between the groove and the tool body;
 friction stir welding at least a portion of the first and second seams so as to secure the cap to the tool body; and
 drawing an electrical conductor through the at least one bore and the conduit in the sub-surface channel.

10. The method of claim 9, wherein the downhole tool comprises a length of drill pipe, a cross over sub, an expandable cutting tool, a drilling jar, a hole opener, an underreamer, or a stabilizer.

11. The method of claim 9, wherein the conduit is deployed in the groove prior to fitting the metallic cap into the groove.

12. The method of claim 9, wherein the conduit is deployed in both the groove and the bore.

13. The method of claim 9, wherein the bore and the groove are substantially parallel with a longitudinal axis of the downhole tool.

14. The method of claim 9, wherein fitting the metallic cap into the groove further comprises:
 (i) rotating a friction stir weld head in contact with one of the seams until a portion of the head penetrates the surface of the tool body: and
 (ii) translating the rotating friction stir weld head along at least a portion of the seam so as to create a friction stir weld zone and secure the cap to the tool body.

15. A downhole tool, comprising: a metallic body having a bore formed at least partially therein and a groove formed in an exterior surface thereof, the bore being aligned with and connected to the groove;
 a metallic cap deployed in the groove, the cap being sized and shaped such that a sub-surface channel is formed in the groove internal to the cap, the metallic cap being joined to the outer surface of the body via at least one friction stir weld zone, the friction stir weld zone including a mechanical mixture of a portion of the metallic cap and a portion of the body; and
 an electrical conductor routed through the bore and the subsurface channel.

16. The downhole tool of claim 15, wherein the friction stir weld zone has a hardness value greater than that of the body.

17. The downhole tool of claim 15, wherein the friction stir weld zone comprises at least one trough in cross-section, the trough having a depth in a range from about 0.05 to about 0.25 inches.

18. The downhole tool of claim 15, wherein the friction stir weld zone has a grain size less than one-half that of the body.

19. The downhole tool of claim 15, further comprising a substantially tubular conduit deployed in the sub-surface channel, the electrical conductor routed through the conduit.

20. The article of manufacture of claim 15, further comprising a substantially tubular conduit disposed in the bore and the sub-surface channel, the electrical conductor routed through the conduit.

21. A downhole tool, comprising:
 a downhole tool body having a bore formed at least partially therein and a groove formed in an outer surface thereof, the bore being aligned with and connected to the groove and the tool body being configured for coupling with a drill string;
 a metallic cap deployed in the groove, the cap being sized and shaped such that a sub-surface channel is formed in the groove internal to the cap, the metallic cap being joined to the outer surface of the body via at least one friction stir weld zone, the friction stir weld zone including a mechanical mixture of a portion of the metallic cap and a portion of the tool body;
 a substantially tubular conduit deployed in the sub-surface channel radially between the cap and the tool body; and
 an electrical conductor routed through the bore and the conduit in the sub-surface channel.

22. The downhole tool of claim 21, wherein the downhole tool comprises a length of drill pipe, a cross over sub, an expandable cutting tool, a drilling jar, a hole opener, an underreamer, or a stabilizer.

23. The downhole tool of claim 21, wherein:
 the friction stir weld zone has a hardness value greater than that of the tool body; and
 the friction stir weld zone has a grain size less than one-half that of the tool body.

24. The downhole tool of claim 21, wherein the conduit is routed through the sub-surface channel and the bore.

* * * * *